(12) United States Patent
Cradic et al.

(10) Patent No.: US 6,436,503 B1
(45) Date of Patent: Aug. 20, 2002

(54) DATA STORAGE MEDIUM CONTAINING POLYESTERCARBONATE

(75) Inventors: Curtis R. Cradic, Newburgh; Steven F. Hubbard, Mt. Vernon, both of IN (US); Cornelis Jan Maria Rijken, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/441,177

(22) Filed: Nov. 15, 1999

Related U.S. Application Data

(60) Provisional application No. 60/153,122, filed on Sep. 8, 1999.

(51) Int. Cl.[7] .................................................. B32B 3/02
(52) U.S. Cl. ................................... 428/64.1; 428/64.4
(58) Field of Search ............................... 428/64.1, 64.2, 428/64.4, 913; 430/270.11, 495.1, 945; 369/283, 288; 528/196, 198

(56) References Cited

U.S. PATENT DOCUMENTS

| | | | |
|---|---|---|---|
| 2,999,835 A | 9/1961 | Goldberg | |
| 3,028,365 A | 4/1962 | Bottenbruch et al. | |
| 3,334,154 A | 8/1967 | Kim | |
| 4,131,575 A | 12/1978 | Adelmann et al. | |
| 4,238,597 A | 12/1980 | Markezich et al. | |
| 4,441,179 A | 4/1984 | Slaten | |
| 4,552,949 A | 11/1985 | Mark | |
| 4,648,392 A | 3/1987 | Cartier et al. | |
| 4,658,392 A | 4/1987 | Langowski et al. | |
| 4,680,374 A | 7/1987 | Hasuo et al. | |
| 4,719,171 A | 1/1988 | Ikenaga et al. | |
| 4,734,488 A | 3/1988 | Hasuo et al. | |
| 4,745,029 A | 5/1988 | Kambour | |
| 4,777,215 A | 10/1988 | Wehnert et al. | |
| 4,902,746 A | 2/1990 | Serini et al. | |
| 4,911,966 A | 3/1990 | Murayama et al. | |
| 4,980,426 A | 12/1990 | Berg et al. | |
| 5,025,081 A | 6/1991 | Fontana et al. | |
| 5,132,154 A | 7/1992 | Westeppe et al. | |
| 5,173,347 A | 12/1992 | Kanno et al. | |
| 5,262,511 A | 11/1993 | Caringi et al. | |
| 5,296,528 A | 3/1994 | Lütjens et al. | |
| 5,321,114 A | 6/1994 | Fontana et al. | |
| 5,414,057 A | 5/1995 | Campbell et al. | |
| 5,424,389 A | 6/1995 | Wimberger-Friedl et al. | |
| 5,455,323 A | 10/1995 | Fontana et al. | |
| 5,459,229 A | 10/1995 | Kelsey et al. | |
| 5,463,013 A | * 10/1995 | Tokuda | ........................ 528/196 |

(List continued on next page.)

FOREIGN PATENT DOCUMENTS

EP          890 944 A1      12/1996

OTHER PUBLICATIONS

PCT International Search Report for International Application No. PCT/US 00/21839.
R. Wimberger–Friedl, M.G.T. Hut and H.F.M. Schoo in *Macromolecules* 29, 5453–5458 (1996).
U.S. Patent application Ser. No. 09/281,497 (Docket No. RD 26999).
U.S. Patent application Ser. No. 09/363,222 (Docket No. RD 26510).

*Primary Examiner*—Elizabeth Evans

(57) ABSTRACT

This invention relates to data storage media, and more particularly to data storage media having both a data storage layer and an adjacent transparent overlayer wherein the data storage layer is capable of reflecting an energy field incident upon said transparent overlayer prior to being incident upon said data layer. Specifically, this invention relates to data storage media having thin transparent polyestercarbonate overlayers.

43 Claims, 3 Drawing Sheets

U.S. PATENT DOCUMENTS

| | | | |
|---|---|---|---|
| 5,494,997 A | * 2/1996 | Fontana | 528/371 |
| 5,503,934 A | 4/1996 | Maas et al. | |
| 5,510,182 A | 4/1996 | Fontana et al. | |
| 5,510,448 A | 4/1996 | Fontana et al. | |
| 5,545,710 A | 8/1996 | Haese et al. | |
| 5,550,205 A | 8/1996 | Sakashita et al. | |
| 5,567,802 A | 10/1996 | McCloskey | |
| 5,646,233 A | 7/1997 | Sakashita et al. | |
| 5,650,470 A | 7/1997 | McCloskey | |
| 5,650,980 A | 7/1997 | Sakurai et al. | |
| 5,670,605 A | 9/1997 | Sakashita et al. | |
| 5,783,653 A | 7/1998 | Okamoto | |
| 5,807,965 A | 9/1998 | Davis | |
| 5,859,172 A | 1/1999 | Sakashita et al. | |
| 5,859,833 A | 1/1999 | Chatterjee et al. | |
| 5,880,248 A | 3/1999 | Sakashita et al. | |
| 5,883,194 A | 3/1999 | Saito et al. | |
| 5,886,073 A | 3/1999 | McCloskey et al. | |
| 5,932,962 A | 8/1999 | Nakatani et al. | |
| 6,022,942 A | 2/2000 | Ishiwa et al. | |
| 6,143,858 A | * 11/2000 | Mobley | 528/196 |

* cited by examiner

DATA STORAGE MEDIUM CONTAINING POLYESTERCARBONATE

CROSS-REFERENCE TO RELATED APPLICATIONS

This application claims priority from Provisional Application No. 60/153,122, filed Sep. 8, 1999.

FEDERALLY SPONSORED RESEARCH

Not applicable

BACKGROUND OF THE INVENTION

This invention relates to data storage media, and more particularly to data storage media having both a data storage layer and an adjacent transparent overlayer wherein the data storage layer is capable of reflecting an energy field incident upon said transparent overlayer prior to being incident upon said data layer. Specifically, this invention relates to data storage media having thin transparent polyestercarbonate overlayers.

Use of optical storage media has become common since the advent of the compact disc (CD) widely used for the storage of music, the digital versatile disk (DVD) for video or other data, and the CD-ROM for computer files. Optical storage media of this type require a transparent overlayer with excellent optical properties, which covers a data layer. The data layer is encoded with information, typically in the form of a series of pits or depressions, in the case of pre-recorded media, or continuous grooves in the case of recordable and rewritable media. In the above conventional formats, the media is disk-shaped. The media is conventionally formed by patterning the overlayer, and later forming a data layer over the overlayer. A laser and an optical pickup system can recover the information stored on the disc by detecting pits or grooves on a suitably coated substrate. With storage devices of this type, there is a growing need to store more and more information in a smaller space.

There are several requirements for the transparent overlayer to ensure that the optical storage media can be manufactured efficiently, will be durable and will function properly. For example, the transparent overlayer must have low birefringence, which is defined as the difference between refractive indices along two perpendicular axes. The measured birefringence of an optical disk has an intrinsic component, which is a characteristic of the material used for the transparent overlayer, and an extrinsic component, which is a function of how much stress is introduced when molding the disk. Materials which are more viscous (i.e., have lower values of melt flow index) tend to produce disks having higher birefringence at similar molding conditions. Large values for birefringence are undesirable because they interfere with reading the data, and thus limit the density of readable information that can be encoded on a disk. Also, it is desirable to move towards relatively thinner transparent overlayers to enable even higher data storage densities. In general, the stresses introduced when injection molding thinner items are greater, and therefore it becomes even more important to find methods for reducing the extrinsic birefringence when creating high density data storage media.

In general, one can reduce the extrinsic birefringence created during a molding operation by using a higher melt flow index (MFI) material because less viscous materials are better able to flow during the molding operation. However, plastics having a higher MFI often are too brittle to provide acceptable durability in optical media applications.

Bisphenol-A Polycarbonate (BPA-PC) has thus far been widely used for optical storage media applications such as the CD and DVD applications. However BPA-PC has some limitations which may make it inadequate or less desirable for some present, and next generation applications. Specifically, BPA-PC that meets acceptable brittleness specifications, is relatively viscous, and therefore is rather difficult to process by injection molding. This difficulty limits the speed with which discs can be manufactured. Also, these processing challenges increase the difficulty of obtaining good pit or groove replication, thus limiting the quality and density of information that can be stored on a disk. Therefore, optical data storage media made from BPA-PC are limited, in terms of their maximum data density, by their birefringence and capability to reproduce pits or grooves on the surface of the plastic substrate. Poor replication of pits or grooves which is influenced by Theological and thermal properties of the polymer melt, as well as process conditions during injection molding, can also lead to increased noise during readout of an optical disk.

Typical CDs utilize a substrate which is 120 mm in diameter and 1.2 mm thick. More recently, the DVD has been introduced. The DVD has two substrates, each 120 mm in radius and only 0.6 mm thick. These substrates are bonded together to make a double-sided optical medium. The decreased thickness requirement for DVD has increased the difficulty of injection molding an overlayer having the necessary birefringence and pit or groove replication because thinner molded parts are subject to greater stress, which increases the extrinsic birefringence. In the future, higher capacity optical storage devices will use even thinner overlayers. Thinner overlayers having acceptable birefringence will be increasingly difficult to fabricate via injection molding of thermoplastic resin.

Better replication and lower stress can be obtained in a hotter molding process using longer cycle times, but BPA-PC is prone to degradation and yellowing at higher temperatures and greater residence times. Alternatively, the molecular weight of BPA-PC can be lowered, but this tends to increase brittleness of the finished disk.

Numerous structural variations of BPA-PC have been tested in an effort to overcome the limitations of BPA-PC in optical media, but many of these variations do not meet all requirements for a successful optical data storage device material. Most variations are either too brittle, have poor optical properties (low transmittance and/or high haze) or are difficult to process due to their high glass transition temperature (Tg). High processing temperatures can also lead to degradation of the polymer chain, which causes loss of mechanical properties, color formation (especially yellowing) and generation of gaseous byproducts impairing optical properties.

Other potential low birefringence optical materials are unacceptable because they are too floppy (have a flex modulus below about 150,000 psi), or have a low thermal capability: (Tg below about 80° C.).

Therefore there is a need to find a transparent overlayer material for optical media that will be transparent, have good melt processability, have low birefringence, have high thermal capability and maintain flatness when used to produce data storage medium having an overlayer thickness of equal to or less than the thickness of today's DVD's (about 0.6 mm).

BRIEF SUMMARY OF THE INVENTION

It has been discovered that polyestercarbonates having an MFI of greater than 14 are capable of providing a satisfactory solution to the above mentioned challenges when used to form overlayer thicknesses of about 0.6 mm or less (such as found in the DVD format). This is somewhat surprising since, as shown below, polyestercarbonates are an inferior solution to these problems when used to make overlayer thicknesses of about 1.2 mm (such as found in the CD format).

In a first aspect, the invention refers to a data storage media which has a data layer and a transparent overlayer adjacent to the data layer. The transparent overlayer has a thickness of about 0.6 mm or less. The storage media is configured such that the data layer will reflect an energy field incident upon the transparent overlayer prior to being incident upon the data layer. The transparent overlayer comprises a polyestercarbonate having a MFI greater than 14.

In a second aspect, the invention refers to a storage media for data which is readable using relative motion between the media and a reading light beam for retrieving the data carried by the media. Said media has a first, disc shaped transparent overlayer which comprises a polyestercarbonate. The polyestercarbonate has monomer units derived from a dihydric phenol and an aliphatic dicarboxylic acid. This polyestercarbonate has an MFI greater than 14. The first transparent overlayer has an entrance surface and an exit surface. The entrance surface is so designated because when the disk is read, an energy field first enters the media through the entrance surface, travels through the first overlayer to the exit surface, and is reflected by the data layer which is adjacent to the exit surface. A first protective layer is adjacent to said data layer opposite the transparent overlayer. A second protective layer is attached to the first protective layer. A second data layer is attached to the second protective layer, and is also designed to reflect an energy field. A second transparent overlayer having an entrance surface and an exit surface is located adjacent to the second data layer and opposite the protective layer. The exit surface of said seconds transparent overlayer is adjacent to the second data layer. The first and second protective layers are attached to each other (e.g., by an adhesive). Alternatively, the first and second protective layers can be a single layer.

In a third aspect, the invention refers to a method for retrieving data. This method comprises rotating a data storage disk such as that described above as the first or second aspects of the invention. This method further comprises directing an energy field at the disk such that the energy field is incident upon a transparent overlayer, and is reflected by a data layer. Finally, this method comprises retrieving information from said data layer via said energy field.

In a fourth aspect, the invention refers to a data storage medium which comprises a polyestercarbonate comprising monomer units derived from a dihydric phenol and an aliphatic dicarboxylic acid. The polyestercarbonate has an MFI of greater than 14 together with a notched izod strength of greater than 1.

In a fifth aspect, the invention refers to a method for retrieving data which comprises reading data from the data storage medium described above in the fourth aspect.

In a sixth aspect, the invention refers to a data storage medium, and method for reading same, wherein said medium has a plurality of data layers and transparent overlayers, and wherein one or more of said data layers is adapted to both partially reflect and partially transmit an incident energy field, and another data layer is adapted to reflect said partially transmitted energy field.

The invention further refers to additional aspects other than those mentioned in this section, which are encompassed by the claims appended hereto.

DETAILED DESCRIPTION OF THE INVENTION

As used herein, the term "data layer" refers to a material whose shape and/or chemical and/or magnetic state corresponds to stored data. For example, the data layer typically used in a CD is an aluminum layer having grooves interspersed with pits corresponding to stored digital information. The data layer may be adapted to simply reflect an incident energy field, or to also act upon it in some way (e.g., absorption, selective reflection, polarization, etc.).

As used herein, the term "energy field" refers to a light beam (which may be a LASER), a magnetic field, an electric field, or a combination of the above which is incident upon the data layer when reading information from the storage media.

As used herein, the term "transparent layer" refers to a material which is not opaque to the energy field, and through which the energy field passes prior to being incident upon the reflective layer.

Figure 4:
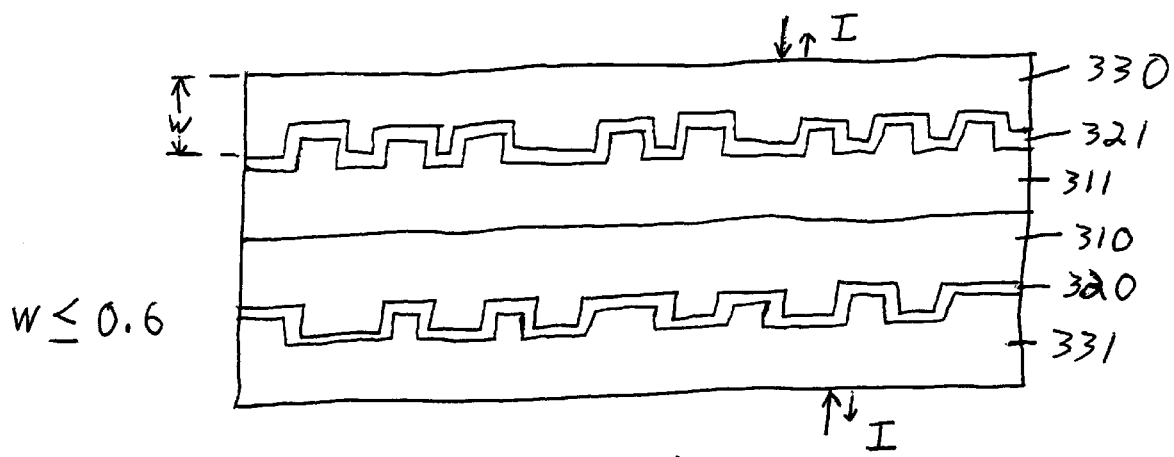
FIG. 4 depicts a dual side single layer DVD according to the invention.
Figure 5:
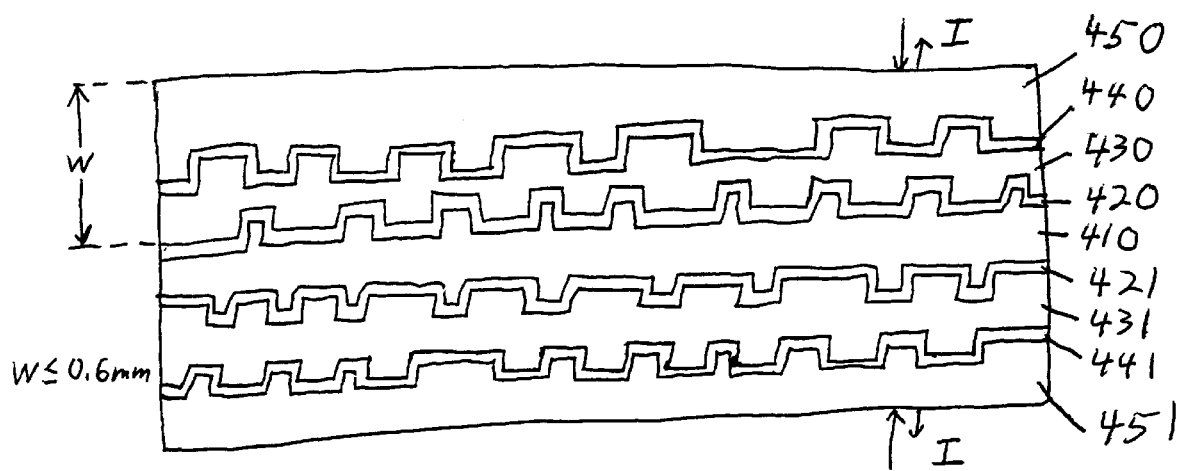
FIG. 5 depicts a dual side multi-layer DVD according to the invention.

As used herein, the term digital versatile disk or DVD refers to an optical disk storage medium having a sandwich structure as depicted in FIG. 4 and FIG. 5. The DVD may store data corresponding to video, audio, or any other sort of data.

The present invention provides a superior data storage medium and a method for reading said medium. This medium is superior because it enables greater storage densities by providing a transparent overlayer which simultaneously has high ductility, low birefringence and low viscosity during manufacture, which produces shorter molding cycle times. This invention is based, in part, on the finding that although certain polyestercarbonates have a poorer balance of properties for making transparent overlayer thicknesses of 1.2 mm, and in fact are not used for this purpose (commercial CD's are made from BPA-PC homopolymer), these same polyestercarbonates have superior properties over BPA-PC homopolymer for overlayer applications of about 0.6 mm or less.

The data storage media according to the invention comprises a transparent overlayer which contains a polyestercarbonate. Specifically, the polyestercarbonate comprises monomer units derived from a dihydric phenol and an aliphatic dicarboxylic acid. The dihydric phenol, aliphatic dicarboxylic acid and a carbonate precursor are typically reacted together to form a polyestercarbonate via the interfacial synthesis method, but other synthesis methods are also possible as described below.

Dihydric phenols which are useful in preparing the copolyestercarbonate of the invention may be represented by the general formula

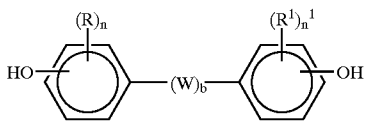

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals:
W is selected from divalent hydrocarbon radicals,

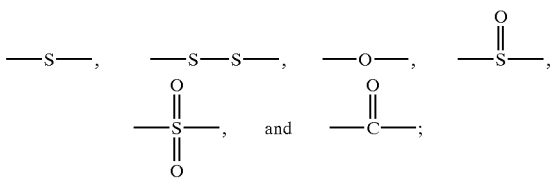

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Some illustrative non-limiting examples of the dihydric phenols falling within the scope of Formula II include:
2,2-bis(4-hydroxyphenyl)propane (bisphenol-A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1 -bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4- thiodiphenol;
4,4-dihydroxy-3,3-dichlorodiphenyl ether; and
4,4-dihydroxy-2,5-dihydroxydiphenyl ether.

Other useful dihydric phenols which are also suitable for use in the preparation of the above polycarbonates are disclosed in U.S. Pat. Nos. 2,999,835; 3,028,365; 3,334,154; and 4,131,575, all of which are incorporated herein by reference. The preferred dihydric phenol is bisphenol A.

The dicarboxylic acid may be aliphatic or aromatic, but is preferably aliphatic. The most preferably aliphatic dicarboxylic acids are alpha omega aliphatic dicarboxylic acids. Preferably, these aliphatic acids have 4–50 carbon atoms, more preferably from 10 to about 20 carbon atoms, and most preferably 10–12 carbon atoms (e.g., dodecanedioic acid). The amount and chain length of the dicarboxylic acid should be adjusted to obtain a material sufficiently transparent such that the resulting polyestercarbonate can function as an overlayer (i.e., allow reading of the data layer). Mixtures of the diacids can also be employed. It should be noted that although they are referred to as diacids, any ester precursor can be employed such as acid halides, preferably acid chloride, diaromatic ester of the diacid such as diphenyl, for example the diphenylester of sebacic acid. With reference to the carbon atom number earlier mentioned, this does not include any carbon atoms which may be included in the ester precursor portion, for example diphenyl. Other suitable dicarboxylic acids are disclosed in Ser. No. 09/363,222, titled "Polyestercarbonate Comprising Residues of Branched Diacids" filed on Jul. 27, 1999, assigned to General Electric Company, invented by Peter D. Phelps, Gary C. Davis, Mohan Amaratunga, and David Mobley. In a particular, preferred embodiment of the invention, from about 2 to 30 mole percent based on the dihydric phenol, of the dicarboxylic acid is incorporated in the polyestercarbonate.

The carbonate precursor typically utilized in the interfacial synthesis method can be any of the standard carbonate precursors such as phosgene, diphenyl carbonate and the like. When using a conventional interfacial process or a bischloroformate interfacial process it is also preferred to use a standard catalyst system well known in the synthesis of polycarbonates and copolyestercarbonates. A typical catalyst system is that of an amine system such as tertiaryamine, amidine or guanidine. Tertiaryamines are generally employed in such reactions. Trialkylamines such as triethylamine are generally preferred.

Several different processes may be used to prepare the polyestercarbonates according to the invention, including those described in U.S. Pat. No. 5,807,965, 5,321,114, 4,238,596 and 4,238,597, which are all incorporated by reference herein. Moreover, further methods for making polyestercarbonates are also described in three applications filed on Oct. 26, 1999, by the same assignee as this application. These applications are titled "Robust Process for the Synthesis of Polyestercarbonate" by Gary C. Davis and David P. Mobley; "Method for Making Polyestercarbonates" by Timothy E. Banach, Gary C. Davis and Kengliem L. Bill; and "Method for Making Polyestercarbonates" by Timothy E. Banach, Gary C. Davis and Kengliem L. Bill. These applications are also incorporated by reference herein. For example, U.S. Pat. No. 5,807,965 describes a synthesis process designed to minimize the formation of anhydride linkages through careful selection of particular catalytic species and phosgenation conditions. In this process, phosgene (a carbonate precursor) is passed through a mixture of a dihydric phenol, a dicarboxylic acid, a hexaalkyl guanidinium salt (phase transfer catalyst), at least one tertiary amine, water and a water immiscible or organic solvent, with the proportion of phosgene being at least 50% stoichiometric.

During this step, the pH is maintained at 4.5 to 9.5, typically by addition of aqueous alkali such as sodium hydroxide or potassium hydroxide. Next, the pH is raised to about 10, and phosgene passage continues until a stoichiometric excess of at least 5% phosgene by weight has been introduced.

Example 1 provides another method for making polyestercarbonates according to the invention.

Also, end capping agents may be added to control molecular weight. The end capping agent must be chemically stable under extrusion conditions. Typical extrusion conditions are 180° to 320°. Phenol is a suitable chain stopping agent, but bulkier chain terminators may provide enhanced physical properties. Examples of bulkier chain terminating groups include paratertiarybutylphenol, isononyl phenol, isooctyl phenol, and cumyl phenols such as meta and paracumyl phenol. Preferred bulky chain terminating groups include paracumyl phenol, as well as chrornanyl compounds such as Chroman I. Preferably, an amount of end capping agent is added which is sufficient to produce a molecular weight below 32,500. In a more preferred embodiment, sufficient end capping agent is added to reduce molecular weight to below 24,000, and in most preferred embodiment below 19,000.

The polycarbonates according to the invention can also be made by other methods such as the melt and/or solid state synthesis techniques.

Additionally, the molecular weight or, equivalently the MFI, can be controlled through the use of a redistribution process where the polyestercarbonate is heated in the presence of a carbonate redistribution catalyst such as diethyldimethylammonium hydroxide or a tetraalkylphosphonium hydroxide, preferably tetrabutylphosphonium hydroxide. A diarylcarbonate, preferably diphenyl carbonate, may be present with the redistribution catalyst. The catalyst will produce a reduction in the molecular weight which may be controlled by altering the amount of catalyst present. Typical redistribution catalysts include tetraorganophosphonium hydroxides, as described in U.S. Pat. Nos. 5,567,802 and 5,886,073, which are hereby incorporated by reference.

In a preferred embodiment of the invention, the mole % dicarboxylic acid is 4 to 10. In a more preferred embodiment, the mole % dicarboxylic acid is 8 to 9.

The polyestercarbonate preferably has an MFI of greater than 14. In a more preferred embodiment of the invention, the polyestercarbonate has an MFI of greater than 16. In a most preferred embodiment of the invention, the polyestercarbonate has an MFI of 20 to 30. All MFI values given herein are measured at 250° C. according to ASTM Standard D1238. The measurements were made using a commercially available extrusion plastometer machine sold by Tinius Olsen.

The maximum birefringence of a molded disk according to the present invention if preferably below 80 nm, and more preferably below 40 nm. In a most preferred embodiment, the maximum birefringence is below 30 nm. It is also preferable for the average birefringence to be below 50 nm, and most preferably below 20 nm. The birefringence of a molded optical media overlayer was measured with commercially available equipment such as an ODS130 Optical Disk Scanner or a Koch CS-4/TO Optitester. These devices illuminate a transparent plastic article with a circularly polarized laser beam and use a polarization-sensitive detection scheme to analyze the reflected or transmitted component of the beam. By comparing the portion of the beam polarized in a disk's radial direction with that polarized in the tangential direction, the phase retardation can be calculated and expressed in units of nanometers.

In preferred embodiments of the invention, the polyestercarbonate had a notched izod value of greater than 1, and more preferably greater than 4. The method used to measure the notched izod value is ASTM D256, which is a test performed at room temperature using ⅛" bars.

In preferred embodiments of the invention, the overlayer is less than about 0.6 mm thick. In alternate embodiments of the invention, the overlayer may be less than 0.3 mm thick, or less than 0.15 mm thick.

The polyestercarbonates according to the invention may further comprise various additives. For example, the polyestercarbonates may comprise dyes, stabilizers, plasticizers, mold release agents, and anti-static agents.

Suitable dyes would include any which are compatible with and fully soluble in the polyestercarbonate and do not cause unacceptable interference with reading the media. Some suitable dyes include quinones, azobenzenes, stilbenes, and phthalocyanines.

Various stabilizers are compatible with polyestercarbonate and are useful to help retard the melt reaction of the material and improve color. Some examples of suitable stabilizers include acidic phosphorus-based compounds and hindered phenols.

In addition, it may also be desirable to add specific mold release agents that retain transparency while allowing easy de-bonding of the formed part from the mold. Since optical discs have very high surface area due to the textured nature of the disc needed for information storage, easy release from the molding tool is quite important. High molecular weight aliphatic esters like pentaerythritol tetra stearate and glycerol monostearate are especially useful to ensure successful release of the disc from the mold.

It may also be advantageous to add anti-static agents to the polyestercarbonate. For example, some suitable anti-static agents include tetraalkylammonium benzene sulfonate salt and tetraalkylphosphonium benzene sulfonate salt.

Various different types of data storage media are known, including, for example, computer hard drives, magneto-optical media, computer CD-ROM, CD-R and CD-RW drives, CD audio and video media, and DVD media including audio video and ROM, as well as DVD-R, DVD-RW, DVD and RW, DVD-RAM, and DVD-9, 10, 14 and 18. U.S. Pat. No. 4,719,171, 4,658,392 and 4,441,179, which are incorporated herein by reference, provide examples of known structures for some of these media. In the future, various new data storage media having thin overlayers will likely be commercialized. All types of storage media having overlayers less than about 0.6 mm thick are intended to be covered by this invention regardless of whether they have been previously commercialized, or will be commercialized in the future.

The optical media described herein are typically produced by injection molding. Specifically, the overlayer is injection molded with a series of pits and grooves corresponding to the data. Later, the data layer is applied to the side of the overlayer that has been patterned with the pits and grooves. However, there are several additional methods for making data storage media. For example, the data layer itself can be patterned first with the information, and the transparent overlayer later adhered to the patterned data layer. Alternatively, the data layer and/or the overlayer may be embossed or stamped rather than injection molded. Any optical media formed by the methods listed above or any other method may be advantageously employed in the present invention.

Present optical methods for reading data storage media typically use red light. In fact, a red laser was used to generate the birefringence measurements reported herein. It is likely in the future that blue lasers will be used with optical data storage media. Blue lasers could be advantageously used to read the polyestercarbonate data storage media described herein.

The polyestercarbonate described herein must be sufficiently free of particles such that unacceptable interference with reading and/or writing the data storage media is avoided. Particles are typically, defined as those having a size above 0.5 microns, and particle content is determined by measuring the amount of scattering in solution. It is preferable to have a particle count below 200,000/g, more preferable to have a particle count below 100,000/g, and most preferable to have a particle count below 20,000/g. Particle count can be reduced by filtering polymer solutions during production, purifying reactants and by using closed system reaction methods.

Figure 1:
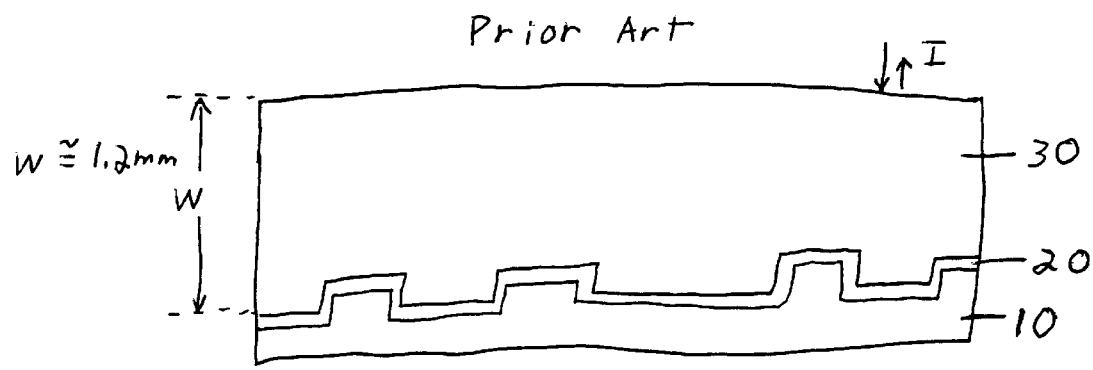
FIG. 1 depicts a cross-section of a simple prior art optical disk comprising a polycarbonate.

Referring to FIG. 1, a prior art CD comprises an overlayer 30, which is typically made from BPA-PC resin. The substrate is coated with a reflective data layer 20, which may be aluminum or some other reflective material such as that disclosed in U.S. Pat. No. 4,648,392. The reflective data layer 20 is covered by a backing layer 10, which comprises a lacquer (preferably a lacquer which hardens upon exposure to ultra-violet radiation). The distance between the surface of the overlayer 30 and the reflective data layer 20 is typically about 1.2 mm.

Figure 2:
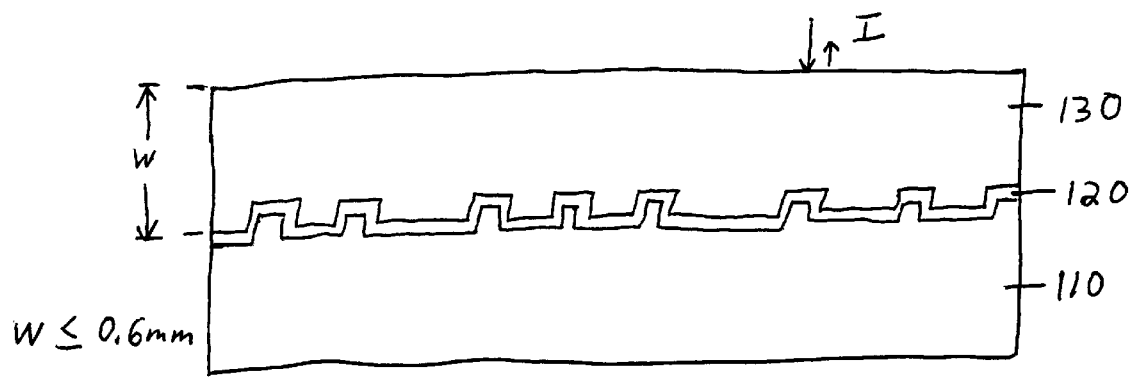
FIG. 2 depicts a cross-section of a data storage media according to the invention, which comprises a polyestercarbonate.
Figure 3:
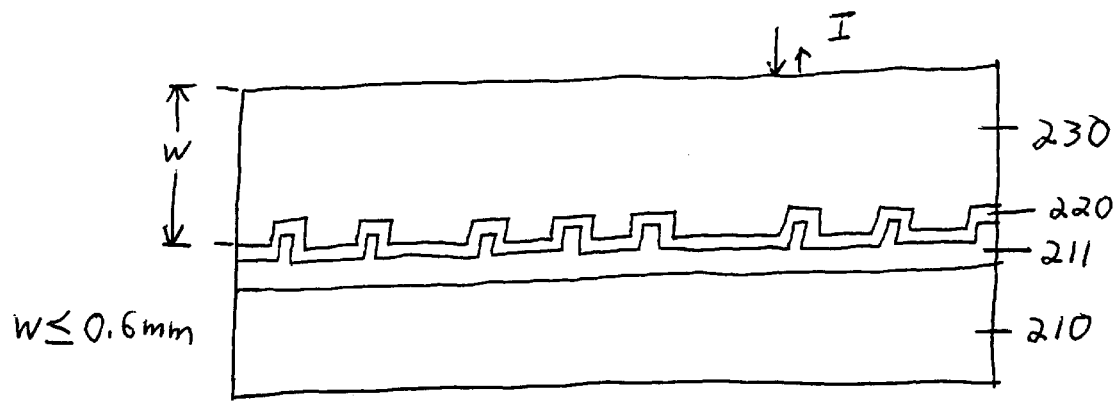
FIG. 3 depicts a cross-section of a data storage media according to the invention which has an optional adhesive layer.

Referring to FIG. 2, a newer, higher data density single side, single layer media is shown. The media comprises a substrate layer 110 covered with a reflective layer 120, which is adapted to reflect, and optionally to alter, an incident energy field. The overlayer 130, is about 0.6 mm thick or less, and comprises a polyestercarbonate as described herein. In an alternate embodiment of the invention, the overlayer 130 is less than 0.3 mm thick. In another alternate embodiment of the invention, the overlayer 130 is less than 0.15 mm thick. The substrate layer 110 preferably also comprises the polyestercarbonate and is about 0.6 mm thick or less. Referring to FIG. 3, another single side, single layer data storage media is shown which has an optional adhesive layer 211. The media of FIG. 3 comprises a substrate layer 210 covered with an adhesive layer 211, which in turn is bound to the reflective data layer 220. The reflective data layer 220 is covered with an overlayer 230, which is about 0.6 mm thick or less.

Referring to FIG. 4, a dual-side single-layer DVD is shown. The DVD comprises a first disk-shaped transparent overlayer 330. The overlayer 330 is made from a polyestercarbonate, as mentioned above. The overlayer 330 covers a first data layer 321. The first data layer 321 also contacts a first bonding layer 311, which in turn is joined to a second bonding layer 310. The second bonding layer 310 contacts the second data layer 320, which in turn is covered by the second transparent overlayer 331. Both overlayers 330 and 331 are about 0.6 mm thick or less, and comprise a polyestercarbonate as described above. This media can be read from either side, or can be modified to allow reading from only one side.

Referring to FIG. 5, a dual-side multi-layer DVD is shown. The DVD comprises a first disk-shaped transparent overlayer 450. The overlayer is made from a polyestercarbonate, as mentioned above. The overlayer covers a first semitransparent first data layer 440. The first data layer 440 also contacts a transparent bonding layer 430, which in turn is joined to a first fully reflective data layer 420. The first fully reflective data layer 420 also contacts the central bonding layer 410, which also adheres to a second fully reflective data layer 421. This second fully-reflective data layer contacts a transparent bonding layer 431 which, in turn, contacts a second semitransparent data layer 441. The second semitransparent data layer 441 is covered by the second transparent overlayer 451. Both overlayers 450 and 451 are about 0.6 mm thick or less, and comprise a polyestercarbonate as described above. The structure shown in FIG. 5 can be modified to optionally allow reading from only 1 side or to include any number of data layers depending on the data storage capacity required.

In one embodiment of the invention, a disk shaped media is employed wherein the medium has a maximum dishing of less than ±0.8 degrees, and more preferably less than ±0.4 degrees. The media also preferably has an average dishing of less than ±0.3 degrees and more preferably less than ±0.2 degrees. Dishing may be measured with commercially available optical disk testers used also to measure birefringence. These instruments illuminate the secured plastic disk with a laser beam and measure the location of the reflected spot. The distance by which the reflected beam is offset from the incident beam is proportional to the dishing.

The present invention is further illustrated by way of the following examples. These examples are intended to be representative of the invention, and are not in any way intended to limit the scope of the invention of the claims.

EXAMPLES

Example 1—Synthesis of Polyestercarbonate

The following example provides a description of a method for synthesizing a polyestercarbonate according to the invention.

Methylene chloride (60 gallons), water (50 gallons), triethylamine (3.5 lbs.), bisphenol-A (200 lbs.), dodecanedioic acid (20 lbs.) and 50% NaOH (22 lbs.) were combine in a formulation tank and stirred for 5 minutes. The mixture was charged to a phosgenation reactor and an additional 50 gallons of methylene chloride was used to rinse the formulation vessel into the reactor. Phosgene was added to the reactor together with sufficient amounts of 50% NaOH to maintain the reaction pH at 8.5 for the first half of the reaction. For the second half of the reaction, the pH control point was raised to 10.5. Paracumyl phenol (5.5 lbs.) was added to the reactor during phosgenation to regulate the polymer Mw. An approximate total of 115 lbs. of phosgene is added to give a minimum uptake of 175 lbs. of 50% NaOH.

The completed reaction batch was discharged from the reactor to a surge tank then fed to a series of liquid/liquid centrifuges in order to separate the brine phase, remove the triethylamine (TEA) by washing the resin phase with 1% aqueous HCl and remove residual ions by washing with DI water. The purified solution of polyestercarbonate resin in methylene chloride was filtered through 1 micron absolute media. The resin solution was then fed to a jet with 150 psi steam at a ratio of approximately 2 to 1 steam to resin to flash off the methylene chloride. The wet cake resin was further dried of residual methylene chloride and water in a fluidized bed of heated nitrogen until less than 0.2% total volatiles remain. The resin obtained (225 lbs.) was a white powder with a Mw of 32500, a chloride ion content of less than 2.0 ppm, a residual TEA content of less than 4.0 ppm.

The polyestercarbonate powder was then fed into a 70 mm twin-screw extruder which was equipped with an on-line rheometer. An aqueous solution of diethyldimethylammonium hydroxide was injected into the extruder near the point where the powder was fed. The rate of injection of the aqueous solution was adjusted until the on-line rheometer read the target melt flow indicated in examples in Table 1, below.

Example 2—Comparison Between Polycarbonate and Polyestercarbonate

In the examples below, those indicated by numbers are examples of the current invention, while those indicated by letters are comparative examples of the prior art. Table 1 shows the comparisons of examples of compact disk injection molding (1.2 mm thickness) made from the different materials and also compares Digital Video Disk (DVD) injection molding (0.6 mm thickness).

Compact disks were made using an 80-ton Compact Disk injection molding machine and CD mold with the melt temperature as indicated in Table 1. The mold temperature was 65 deg C. Melt temperatures were chosen to give the best performance of the finished disks. Injection molding of the copolyestercarbonate at the same melt temperature as homopolycarbonate (example A) yielded severely warped disks that could not be characterized by normal means.

For compact disks, the birefringence and dishing were measured with an OMP ODS130 optical disk scanner. Results in Table 1 include the average birefringence observed in the CD, as well as the maximum single point of birefringence on a disk. Maximum dishing and average dishing are also shown. High-quality CDs have maximum birefringence below 80nm, preferably below 60nm and average birefringence below 40nm, preferably below 30nm. Maximum dishing needs to be below 0.8 degrees, preferably below 0.6 degrees, with average dishing below 0.6 degrees, preferably below 0.5 degrees. It is, therefore, apparent from examples A, B, and C that the high-flow copolyestercarbonate does not produce a compact disk of comparable quality to a disk produced from homopolycarbonate.

DVD examples (D, 1, and 2) were molded using a DVD (0.6 mm) mold on an injection molding machine. The melt temperature is indicated in table 1, and the mold temperature was 110 deg. C.

The DVD examples (0.6 mm thickness) had birefringence and dishing measured by a Koch CS-4/TO Optitester. It is apparent that for a given melt temperature in injection molding, the copolyestercarbonate substrates of the current invention are superior to substrates molded from homopolycarbonate.

be used in recordable optical media such as those based on photo-burnable dyes, including phtahlocyanine, rewritable optical media including those based on optically-induced phase change materials and magneto-optical technology. The current invention would provide benefits in optically-assisted magnetic media such as fixed and removable computer disks and recordable and rewritable video disks. Advantages of the current invention are not limited to disk-shaped media but are applicable to any geometry of storage media which use high optical quality and low viscosity to an advantage including card-based optical or optically-assisted magnetic media.

The low birefringence copolycarbonates described herein could advantageously be used in all types of typical applications for polycarbonate, particularly those where low birefringence, low viscosity and/or optical quality provides some advantage. Specifically, the copolycarbonates described herein may be used in films for optical media, near field optical recording applications, ophthalmic lens applications, lenses for laser applications, cameras and imaging, liquid crystal substrates, visors, aircraft canopies, glazing, display screens, in-mold decorated parts, waveguides (e.g., core and/or cladding for single and multimode optical fibers, slab or channel waveguides, and lightpipes), and active photonic devices such as modulators (e.g., electro-optic or acousto-optic). Moreover, the copolycarbonates described herein may be used to make articles by injection molding, fiber spinning, extrusion, solution casting, and any other manufacturing method compatible with polycarbonates. It should also be noted that various types of additives which are known to be compatible with Polycarbonate could be incorporated in the polycarbonate.

The copolycarbonates described herein may be produced via any process which leads to the specified range of MFI and ductility. The use of redistribution catalysts is optional. Any redistribution catalyst capable of increasing the MFI to the specified range may be used. Alternately, the polyestercarbonate production process may be controlled to ensure that the MFI is in or near the specified range prior to extrusion, which reduces or eliminates the need for redistribution catalyst.

It is understood that the copolycarbonate synthesis methods described herein may affect the amount of residual low molecular weight species (e.g., diarylcarbonate and anhydride) in the resulting resin. The amount of low molecular weight species present in the copolycarbonate may

TABLE 1

Examples of the current invention and examples of the prior art

| Example | Material | MFI g/10 min | Thickness mm | Melt Temp deg C | Max Biref nm | Ave Biref nm | Max dishing deg | Ave dishing deg |
|---|---|---|---|---|---|---|---|---|
| A | homoPC | 14 | 1.2 | 315 | 58.5 | 21 | 0.49 | 0.41 |
| B | CPEC | 27 | 1.2 | 275 | 108.2 | 41 | 1.1 | 0.61 |
| C | CPEC | 16 | 1.2 | 275 | 84.4 | 58 | — | — |
| D | homoPC | 14 | 0.6 | 370 | 45 | | −0.32 | |
| | | | | 330 | 55 | | −0.24 | |
| 1 | CPEC | 27 | 0.6 | 340 | 28 | −6 | −0.14 | −0.1 |
| | | | | 330 | 48 | 16 | −0.22 | −0.19 |
| 2 | CPEC | 23 | 0.6 | 330 | 36 | 10 | −0.2 | −0.175 |

Although the present invention has been described in considerable detail with reference to certain preferred versions thereof, other versions are possible. For example, the data storage media described herein could advantageously impact certain properties of injection molded parts such as surface deformation and clouding. Therefore, it may be desirable to use certain techniques to reduce residual low molecular weight species such as those described in U.S.

patent application Ser. No. 09/281,497, which is hereby incorporated by reference.

It should also be noted that various types of additives which are known to be compatible with polycarbonate, but are not specifically mentioned herein, could be incorporated in the polyestercarbonate.

It should further be noted that the polyestercarbonates described herein could be blended together with another thermoplastic resin to form a thermoplastic resin system provided the system was transparent and had a Tg below 140° C., and preferably below 135° C.

What is claimed is:

1. A data storage media, said media comprising:
   a) a data layer, and
   b) a transparent overlayer adjacent to said data layer,
      wherein said transparent overlayer has a thickness of less than about 0.6 mm, and said overlayer comprises a thermoplastic resin system, which system comprises a polyestercarbonate comprising monomer units derived from a dihydric phenol and a dicarboxylic acid, said polyestercarbonate having an MFI of greater than 14, and
      wherein said data layer is adapted to reflect an energy field incident upon said transparent overlayer prior to being incident upon said data layer.

2. The storage media according to claim 1, wherein said media is a disk.

3. The storage media according to claim 2, wherein said data layer is adapted to alter and reflect the energy field.

4. The storage media according to claim 2, wherein said storage media is a digital versatile disk.

5. The storage media according to claim 2, wherein said energy field is selected from the group consisting of a light beam, an electric field, a magnetic field, and combinations thereof.

6. The storage media according to claim 2, wherein the disk has a maximum birefringence of less than 80 nm.

7. The storage media according to claim 6, wherein the disk has a maximum birefringence of less than 40 nm.

8. The storage media according to claim 2, wherein the disk has a maximum dishing of less than ±0.8 degrees.

9. The storage media according to claim 8, wherein the disk has a maximum dishing of less than ±0.4 degrees.

10. The storage media according to claim 9, wherein the disk has an average dishing of less than ±0.3 degrees.

11. The storage media according to claim 10, wherein the disk has an average dishing of less than ±0.2 degrees.

12. The storage media according to claim 6, wherein the disk has an MFI of greater than 16, and a notched izod strength of greater than 1.

13. The storage media according to claim 12, wherein the disk has an MFI of greater than 20.

14. The storage media according to claim 2, wherein the polyestercarbonate further comprises the residue of an end capping agent selected from the group consisting of phenol, paratertiarybutylphenol, isononyl phenol, isooctyl phenol, and a cumyl phenol.

15. The storage media according to claim 14, wherein the end capping agent is paracumyphenol.

16. A storage media for data of the type readable using relative motion between the media and a reading light beam for retrieving the information carried by the media, said storage media comprising:
   a) a first disk-shaped transparent overlayer having a thickness of less than 0.6 mm, which comprises a polyester carbonate comprising monomer units derived from a dihydric phenol and an aliphatic dicarboxylic acid, said polyestercarbonate having an MFI of greater than 14, said first disk-shaped transparent overlayer having at least a first entrance surface and a first information surface,
   b) a first data layer adjacent to said first information surface of the first disk-shaped transparent overlayer, said first data layer having a shape corresponding to stored data, wherein said first data layer is adapted to reflect an energy field incident upon said fist disk-shaped transparent overlayer prior to being incident upon said first data layer,
   c) a first protective layer adjacent to said data layer and opposite said first overlayer,
   d) a second protective layer joined to the first protective layer opposite said first data layer,
   e) a second data layer adjacent to said second protective layer, said second data layer having a shape corresponding to stored data, and
   f) a second disk-shaped transparent overlayer having a thickness of about 0.6 mm or less, which comprises a polyester-carbonate comprising monomer units derived from a dihydric phenol and an aliphatic dicarboxylic acid, said polyestercarbonate having an MFI of greater than 14, said second disk-shaped transparent overlayer having at least a second entrance surface and a second information surface, wherein the second information surface is adjacent to said second data layer.

17. The storage media according to claim 16, wherein the first and second protective layers are joined together by an adhesive.

18. The storage media according to claim 17, wherein said first and second overlayers both have a maximum birefringence of less than 80 nm, and a notched izod strength of greater than 1.

19. The storage media of claim 18, wherein said first and second overlayers both have an MFI of greater than 16.

20. The storage media of claim 19, wherein said first and second overlayers both have an MFI of greater than 20.

21. A method for retrieving data comprising:
   a) rotating a disk-shaped data storage media, said media comprising a data layer and a transparent overlayer adjacent to said data layer,
      wherein said transparent overlayer has a thickness of less than about 0.6 mm, and said overlayer comprises a polyestercarbonate comprising monomer units derived from a dihydric phenol and an aliphatic dicarboxylic acid, said polyestercarbonate having an MFI of greater than 14, and
      wherein said data layer is adapted to reflect an energy field incident upon said transparent overlayer prior to being incident upon said data layer,
   b) directing an energy field at said storage media such that energy field is first incident upon said transparent overlayer, and is then reflected by said data layer,
   c) retrieving information from said data layer via said energy field.

22. The method according to claim 21, wherein said media is a disk.

23. The method according to claim 22, wherein said data layer is adapted to alter and reflect the energy field.

24. The method according to claim 22, wherein said storage media is a digital versatile disk.

25. The method according to claim 22, wherein said energy field is selected from the group consisting of a light beam, an electric field, a magnetic field, and combinations thereof.

26. The method according to claim 22, wherein the disk has a maximum birefringence of less than 80 nm.

27. The method according to claim 26, wherein the disk has a maximum birefringence of less than 40 nm.

28. The method according to claim 22, wherein the disk has a maximum dishing of less than ±0.8 degrees.

29. The method according to claim 28, wherein the disk has a maximum dishing of less than ±0.4 degrees.

30. The method according to claim 29, wherein the disk has an average dishing of less than ±0.3 degrees.

31. The method according to claim 30, wherein the disk has an average dishing of less than ±0.2 degrees.

32. The method according to claim 26, wherein the disk has an MFI of greater than 16, and a notched izod strength of greater than 1.

33. The method according to claim 32, wherein the disk has an MFI of greater than 20.

34. The method according to claim 22, wherein the polyestercarbonate further comprises the residue of an end capping agent selected from the group consisting of phenol, paratertiarybutylphenol, isononyl phenol, isooctyl phenol, and a cumyl phenol.

35. The method according to claim 34, wherein the end capping agent is paracumylphenol.

36. A data storage media, said media comprising:
a) a plurality of data layers, and
b) a plurality of transparent overlayers,
    wherein said transparent overlayers have a thickness of less than about 0.6 mm, and said overlayers comprise a polyestercarbonate comprising monomer units derived from a dihydric phenol and an aliphatic dicarboxylicacid, said polyestercarbonate having an MFI of greater than 14,
    wherein said data layers are adapted to reflect an energy field incident upon said transparent overlayers prior to being incident upon said data layers.

37. The data storage media according to claim 36, wherein at least one of said data layers is adapted to partially reflect an incident energy field and also partially transmit an incident energy field and another data layer is adapted to reflect said partially transmitted incident energy field.

38. The data storage media according to claim 36, wherein said media is a disk that can be read from both sides.

39. The storage media according to claim 1, wherein said resin system consists essentially of the polyestercarbonate.

40. The storage media according to claim 1, wherein the dicarboxylic acid is an aliphatic dicarboxylic acid.

41. The storage media according to claim 40, wherein the aliphatic dicarboxylic acid has from 10 to about 20 carbon atoms.

42. The storage media according to claim 1, wherein the polyestercarbonate further comprises an end capping agent.

43. The storage media according to claim 1, wherein said resin consists of the polyestercarbonate.

* * * * *